(No Model.)
W. B. THARP.
SHAWL STRAP.
No. 303,896. Patented Aug. 19, 1884.
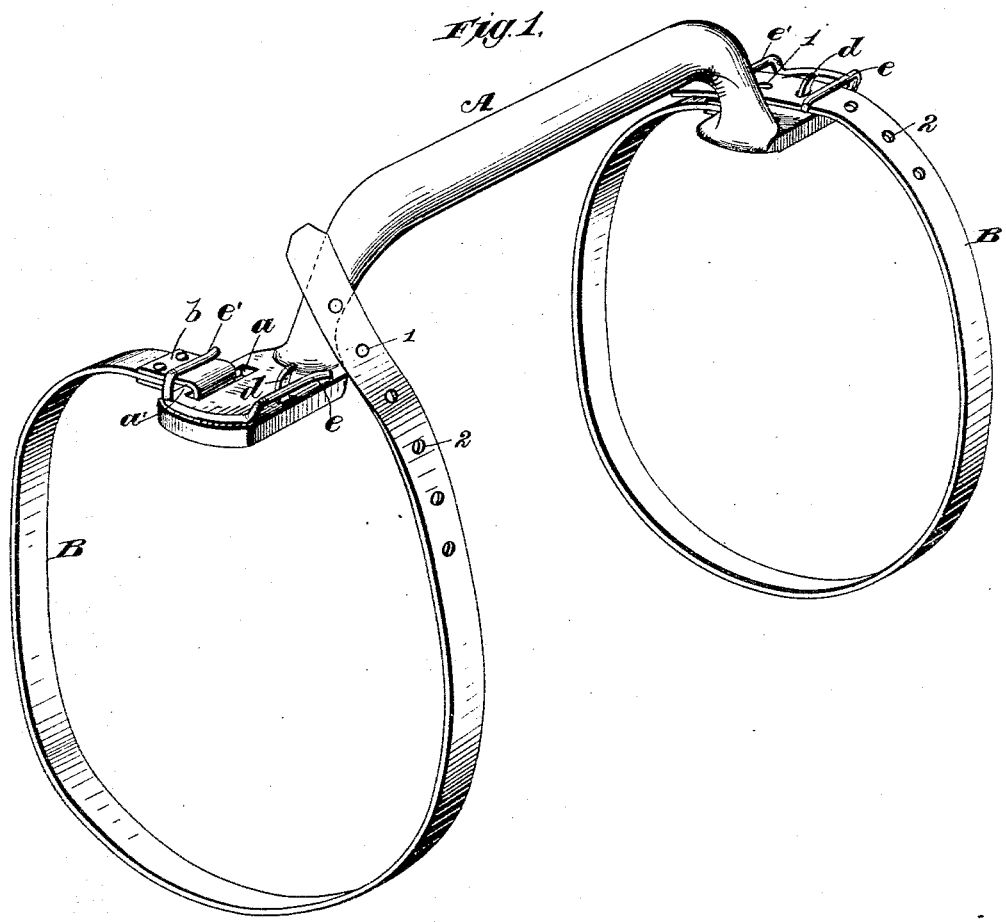
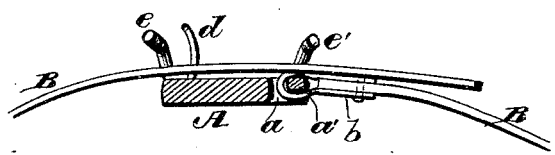
Witnesses,
Robert Garrett
Chas. J. Hyer
Inventor:
William B. Tharp.
By James L. Norris
Atty.

UNITED STATES PATENT OFFICE.

WILLIAM B. THARP, OF EAGLE PASS, TEXAS.

SHAWL-STRAP.

SPECIFICATION forming part of Letters Patent No. 303,896, dated August 19, 1884.

Application filed January 22, 1884. (No model.)

*To all whom it may concern:*

Be it known that I, WILLIAM B. THARP, a citizen of the United States, residing at Eagle Pass, county of Maverick and State of Texas, have invented new and useful Improvements in Shawl-Straps, of which the following is a specification.

My invention relates to shawl, book, and other straps, and has for its object to provide a cheap, simple, and efficient article, which can be used with packages of any size, and fastened thereto easily and quickly without applying buckles to the ends of the straps.

To this end my invention consists in a rigid shawl-strap bar having a short slot formed at each flattened end, near one side, within which one extremity of the strap is looped, and a stud rising from each end of the bar in the line of the strap, with a double guard extending in front and in rear of said stud, said guards being open at the inner end to permit the lateral insertion of the strap and secure its engagement with the stud.

Referring to the drawings, Figure 1 is a perspective view of a shawl-strap embodying my invention. Fig. 2 is a vertical cross-section of one end of the shawl-strap bar.

In said drawings, the letter A designates the shawl-strap bar, which may be made of any suitable material—such as metal—and finished in any suitable manner, and, if desired, the central part, or handle proper, which is grasped by the hand, may be enlarged by leather, wood, or other material, to avoid unnecessary weight of metal; but the particular form and material of the handle are not material to the invention, as it can be made in various ways. In the ends of the bar I cut a slot, $a$, parallel to and near one edge, leaving a strap-bar, $a'$, which receives a loop, $b$, upon one end of the strap B. The latter is formed in the usual manner, and provided with holes 1, 2, &c., at suitable intervals. Upon the ends of the shawl-strap bar, and near that side which is opposite the slot $a$, is placed an upright stud, $d$, arranged in the central line of the strap, or thereabout. Upon the ends of the bar A are attached guards $e\ e'$, which lie just above and parallel with the sides of the bar, or substantially so, and raised above it sufficiently far to permit the insertion of the strap B beneath them. It will be seen that one of these guards, $e$, crosses the body of the stud $d$, a little in front of the same, while the other, $e'$, lies just over the bar $a$, to which the loop on the strap is permanently fastened. Both guards are open at the end next the handle, to permit the insertion of the straps and their engagement with the studs $d$.

In operation the straps B are carried around the package, and after proper tension is exerted they are slipped laterally between the guard $e$ and the stud, and so guided that upon releasing or slackening the strap the stud will enter one of its perforations, the other end being then slipped under the guard $e'$.

It will be noticed that the curved end of the handle acts as a guide to aid in the insertion of the strap beneath both the guards, and enables it to be quickly and securely fastened. The ends of the bar are necessarily of metal to secure the requisite strength, and, if desired, the guards may be made of the same metal; but they may, however, be made separately, and united to the shawl-strap bar by soldering, riveting, or in any other suitable manner. These guards may be made of brass, steel, or other suitable material.

It will be noticed that the upper part of the stud $d$ is bent slightly forward to present its end to the perforations in the strap at a convenient angle, and facilitate the engagement of the two. This lower portion of the stud may, however, be curved in such manner that the tension of the strap will tend to secure its engagement. The guard $e$ will prevent the strap from being thrown off the stud accidentally, and the guard $e'$ secures the loose end of the strap.

By my invention I provide a shawl-strap in which all the fastenings are rigid and permanent, and which is extremely simple in use.

Having thus described my invention, what I claim is—

1. A shawl, book, or other strap bar having slots cut in its end, to which one extremity of the strap is looped, guards lying above and in substantial parallelism with the sides of said bar and raised sufficiently to permit the lateral insertion of the strap beneath said guards, and a stud rising from the bar in rear of one of said guards, both of which are open at their inner ends, the handle of the shawl-strap bar being curved downward at each end and serving as a guide for the insertion of the strap, substantially as described.

2. In a shawl, book, or other strap, the combination, with a bar, A, curved downward at each end, of the flat extremities having slots $a$, for the permanent fastening of the straps, the studs $d$, rising vertically therefrom, near the side opposite to said slots, and the guards $e\ e'$, lying in substantial parallelism with the sides of the bar, and raised above it to permit the lateral insertion of the strap, substantially as described.

In testimony whereof I have hereunto set my hand in the presence of two subscribing witnesses.

W. B. THARP.

Witnesses:
W. F. GILLESPIE,
D. W. GILLESPIE.